United States Patent [19]

Hoashi

[11] Patent Number: 5,541,724
[45] Date of Patent: Jul. 30, 1996

[54] OPTICAL RADAR SYSTEM FOR AUTOMOTIVE VEHICLE

[75] Inventor: Yoshiaki Hoashi, Toyota, Japan

[73] Assignee: Nippondenso Co., Ltd., Kariya, Japan

[21] Appl. No.: 527,387

[22] Filed: Sep. 13, 1995

Related U.S. Application Data

[63] Continuation of Ser. No. 118,235, Sep. 9, 1993, abandoned.

[30] Foreign Application Priority Data

Sep. 9, 1992 [JP] Japan ................................. 4-240756

[51] Int. Cl.$^6$ ............................................. G01C 3/08
[52] U.S. Cl. ..................... 356/5.1; 356/4.01; 356/4.07
[58] Field of Search ........................... 356/5.1, 3.03, 356/4.07, 4.01

[56] References Cited

U.S. PATENT DOCUMENTS 4,674,869  6/1987  Pryor et al. ............................ 356/1
4,968,146  11/1990  Heizmann et al. ...................... 356/1

FOREIGN PATENT DOCUMENTS 61-3486  1/1986  Japan.
61-3485  1/1986  Japan.
63-167213  11/1988  Japan.

Primary Examiner—Stephen C. Buczinski
Attorney, Agent, or Firm—Cushman Darby & Cushman, L.L.P.

[57] ABSTRACT

An optical radar system for tracking a target object is provided. This radar system includes generally a light emitting unit for emitting light toward the target object and a light receiving unit for intercepting the light reflected from the target object. The light receiving unit includes a condenser lens arranged for capturing the reflected light and a light sensitive element arranged at a position offset from a focal point of the condenser lens by a preselected distance in an image forming space thereof to be exposed to the light propagated from the condenser lens for assuring a narrower detection range for a distant target object and a wider detection range for a close target object.

8 Claims, 6 Drawing Sheets

OPTICAL RADAR SYSTEM FOR AUTOMOTIVE VEHICLE

This is a continuation of application Ser. No. 08/118,235, filed on Sep. 9, 1993, which was abandoned upon the filing hereof

BACKGROUND OF THE INVENTION

1. Technical Field

The present invention relates generally to an optical radar system which is operable to track an object present in a front detection area. More particularly, the invention relates to a laser radar system which may be employed in an automotive anti-collision system for automatically detecting the presence or absence of a preceding vehicle and measuring distance to the preceding vehicle.

2. Background Art

Japanese Utility Model First Publication Nos. 61-3485 and 613486 disclose conventional optical radar systems wherein a prism or a reflective mirror are disposed in light emitting or light receiving units for assuring a wide detection range.

In order to ensure a wide detection range without use of such a prism and/or a reflective mirror, it is necessary to widen a light-sensitive surface of a light receiving element and employ a condenser lens system having a short focal length in an optical system of the light receiving element. The widening the light-sensitive surface of the light receiving element, however, causes a parasitic capacity to be increased proportionally, resulting in a response rate of the light receiving element being undesirably reduced. In addition, the condenser lens system requires a wide light receiving area for capturing light as much as possible, causing the focal length of the condenser lens system to inevitably become long. This results in an obtainable angle of field of the radar system being restricted unadvantageously.

SUMMARY OF THE INVENTION

It is therefore a principal object of the present invention to avoid the disadvantages of the prior art.

It is another object of the present invention to provide an optical radar system which features a positional relation between a condenser lens system and a light receiving element to assure a wide detection range in view of the fact that a detectable distance in a peripheral direction may usually be shorter than that in a forward direction in an automotive radar system.

According to one aspect of the present invention, there is provided an optical radar system for detecting a target object which comprises a light emitting means for emitting light toward the target object and a light receiving means for receiving the light reflected from the target object. The light receiving means includes a condenser lens arranged for capturing the reflected light and a light sensitive element arranged at a position offset from a focal point of the condenser lens by a preselected distance in an image forming space thereof to be exposed to the light propagated through the condenser lens.

In the preferred mode, the light sensitive element is located at a position in the image forming space of the condenser lens which assures a narrower detection rage for a distant target object and a wider detection range for a close target object. The light sensitive element preferably be arranged at a position shifted toward said condenser lens from a focal surface of said condenser lens. Alternatively, the light sensitive element may be arranged at a position opposite a focal surface of sad condenser lens with respect to said condenser lens.

According to another aspect of the present invention, there is provided an optical radar system for detecting a target object which comprises a light emitting means for emitting light toward the target object and a light receiving means for receiving the light reflected from the target object. The light receiving means includes a first condenser lens arranged at a first position for capturing the reflected light, a second condenser lens arranged at a second position different from the first position for capturing the reflected light, a first light sensitive element arranged at a position offset from a focal point of the first condenser lens by a preselected distance in an image forming space of the first condenser lens to be exposed to the light propagated through the first condenser lens, and a second light sensitive element arranged at a position offset from a focal point of the second condenser lens by a preselected distance in an image forming space of the second condenser lens to be exposed to the light propagated through the second condenser lens.

In the preferred mode, the first and second light sensitive elements are located at positions in the image forming space of the first and second condenser lenses respectively which assure a narrower detection range for a distant target object and a wider detection rage for a close target object. For example, the first and second light sensitive elements may be arranged respectively at positions shifted toward the first and second condenser lenses from focal surfaces of the first and second condenser lenses.

In addition, the first light sensitive element may be arranged in a manner wherein the center of the first light sensitive element is placed at a position offset from an optical axis of the first condenser lens toward the second light sensitive element. The second light sensitive element may also be arranged in a manner wherein the center of the second light sensitive element is located at a position offset from an optical axis of the second condenser lens toward the first light sensitive element.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
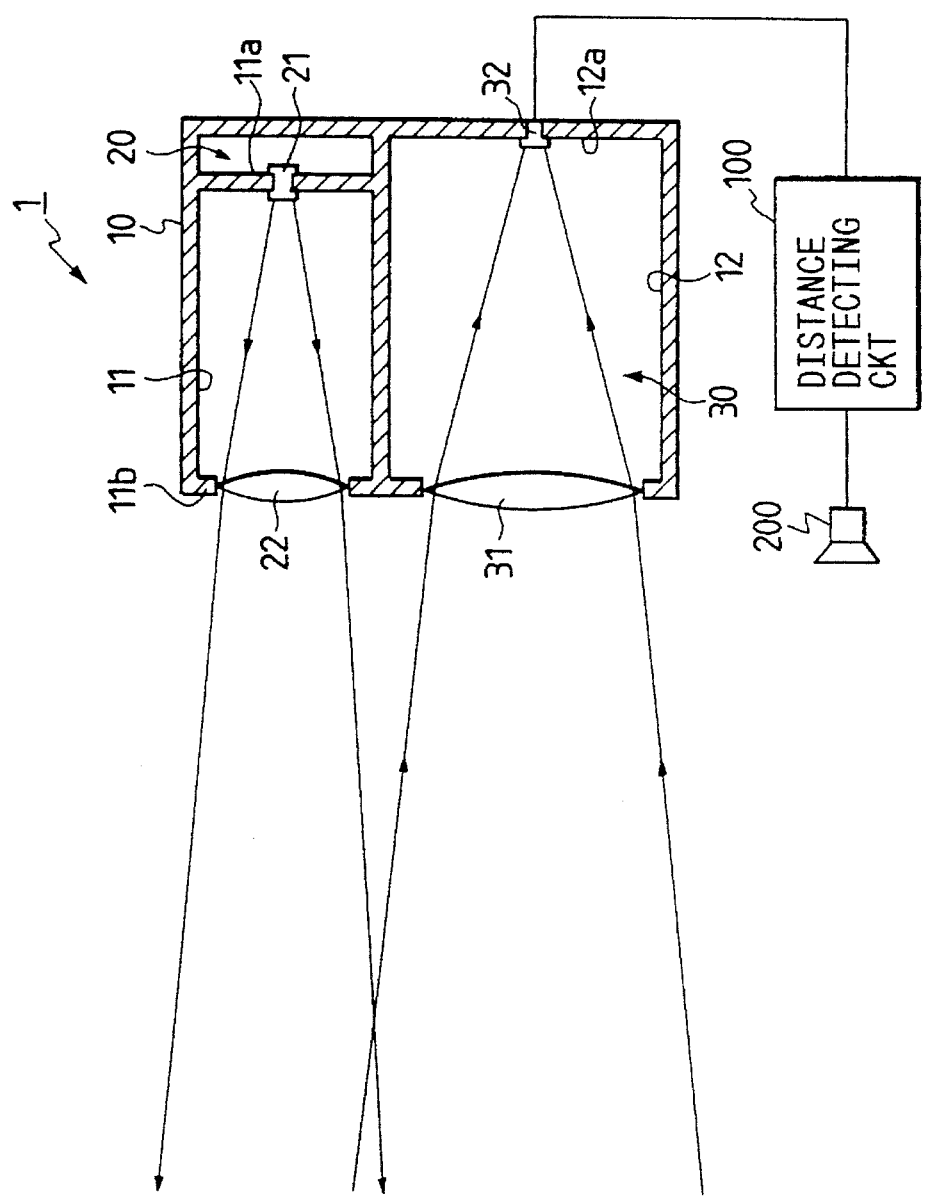
FIG. 1 is an illustration which shows an optical radar system according to the present invention.

Referring now to the drawings, particularly to FIG. 1, there is shown an optical radar system 1 according to the present invention which is applicable to an automotive anti-collision system, for example. The optical radar system 1 includes generally a light emitting unit 20, a light receiving unit 30, a distance determining circuit 100, and an alarm 200.

The light emitting unit 20 is arranged in a casing 10 coaxially with a cylindrical chamber 11. Similarly, the light receiving unit 30 is arranged in the casing 10 coaxially with a cylindrical chamber 12. The center lines of the cylindrical chambers 11 and 12 are orientated parallel to each other. The light emitting unit 20 includes a laser diode 21 which is mounted in a bottom plate 11a of the casing 10 coaxially with the cylindrical chamber 11. The laser diode 21 is adapted for projecting a laser beam over a range, as shown by arrows in FIG. 1. The light emitting unit 20 further includes a condenser lens 22 which is fitted in an aperture 11a of the cylindrical chamber 11 coaxially therewith so that it converges the laser beam from the laser diode 21 to project it forwardly.

The light receiving unit 30 includes a condenser lens 31 which is fitted in an aperture 12a of the cylindrical chamber 12. The condenser lens 31 is adapted for capturing over a range, as shown by arrows the laser light which has been transmitted from the light emitting unit 20 and then reflected by an object ahead of a system vehicle to direct it onto a light receiving element 32. The light receiving element 32 is secured in a bottom plate 12a of the cylindrical chamber 12 coaxially with the condenser lens 31 and includes a pin photodiode 33, as shown in FIG. 2(A), which has a light-sensitive surface optically orientated in a coaxial relation with the condenser lens 31.

Connected to the pin photodiode 33 is the distance determining circuit 100 which is operable to determine distance between the system vehicle and an object present ahead thereof based on a phase difference between laser light transmitted from the light emitting unit 20 and reflected laser light captured by the light receiving unit 30. In addition, the alarm 200 is connected to the distance determining circuit 100 which raises an alarm when the distance between the system vehicle and the object becomes shorter than a preselected distance.

Figure 2A:
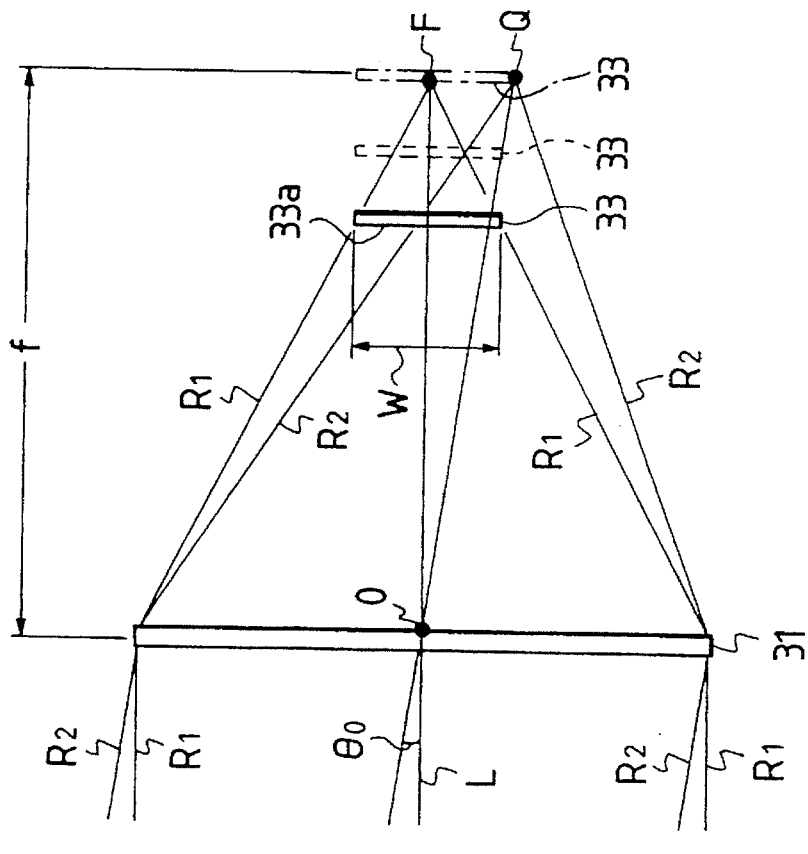
FIG. 2(A) is an illustration which represents an optical relation between a condenser lens and a pin photodiode serving as a light receiving element.
Figure 2B:
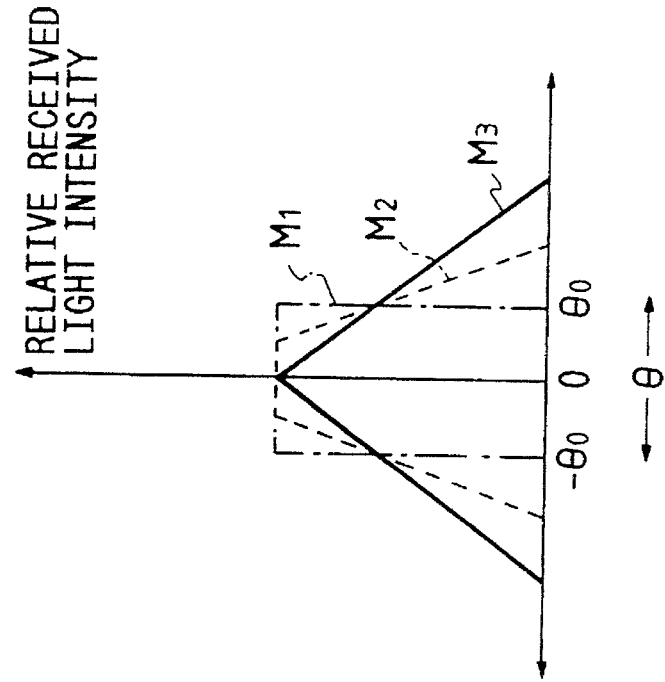
FIG. 2(B) is a graph which shows the variation in intensity of received light over an angle of field of a pin photodiode.

With reference to FIGS. 2(A) and 2(B), an optical relationship of the pin photodiode 33 with the condenser lens 31 will be discussed below. In the following discussion, it is assumed that the condenser lens 31 includes a thin convex lens, an image forming side focal point lies at a point F, the focal length of the condenser lens 31 is labelled f, and an optical axis extending through a pole O of the condenser lens 31 is labelled L.

With the shown arrangement, a bundle of laser rays R1 propagated into the condenser lens 31 in parallel to the optical axis L is focused on the focal point F. In addition, a bundle of laser rays R2 propagated into the condenser lens 31 at an incident angle $\theta(=\theta_0)$ relative to the optical axis L is focused on an image point Q which is offset downward, as viewed in the drawing, from the focal point F. Note that the incident angle $\theta$ corresponds to an angle of field of the pin photodiode 33, or an angle of field of the optical radar system.

It is further assumed that the width of the light-sensitive surface 33a of the pin photodiode 33 (i.e., an interval between both ends of the light intercepting surface 33a) is labelled W which is twice the interval between the focal point F and the image point Q. When the light-sensitive surface 33a of the pin photodiode 33 is, as shown by a dashed line in FIG. 2(A), arranged perpendicular to the optical axis L through the focal point F, the bundle of laser rays at an incident angle greater than $\theta_0=\tan^1 (W/2f)$ forms an image on a point offset downward from the image point Q on the focal surface of the condenser lens 31. Thus, an image is not formed on the light-sensitive surface 33a of the pin photodiode 33 and a received light intensity on the pin photodiode 33 becomes zero. The pin photodiode 33 with the light-sensitive surface 33a being placed on the focal point F, as shown by a dashed line M1 in FIG. 2(B), exhibits a relative received light intensity of a constant value within a field angle range of from $-\theta_0$ to $+\theta_0$, while it exhibits the relative received light intensity of zero out of the range of from $-\theta_0$ to $+\theta_0$.

Alternatively, when the light-sensitive surface 33a of the pin photodiode 33 is, as shown by a broken line in FIG. 2(A), shifted toward the condenser lens 31 from the focal point F by a preselected distance, a bundle of laser rays at an incident angle below $\theta_0$ are sometimes partly offset out of the light-sensitive surface 33a of the pin photodiode 33, while a bundle of laser rays propagated into the condenser lens 31 even at an incident angle above $\theta_0$ partly reaches the light-sensitive surface 33a of the pin photodiode 33. Therefore, with this arrangement, the relative intensity of light received by the pin photodiode 33 is, as shown by a broken line M2 in FIG. 2(B), decreased linearly out of the field angle rage of from $-\theta_0$ to $+\theta_0$.

Additionally, when the light-sensitive surface 33a of the pin photodiode 33 is, as shown by a solid line in FIG. 2(A), arranged at a position nearest the condenser lens 31, the amount of laser rays at an incident angle above $\theta_0$ reaching the light-sensitive surface 33a of the pin photodiode 33 is further increased. The relative intensity of light received by the pin photodiode 33 is, as shown in a solid line M3 in FIG. 2(B), decreased at a rate smaller than that shown by the broken line M2 out of the field angle range of from $-\theta_0$ to $+\theta_0$.

It will thus be appreciated that by arranging the pin photodiode 33 in place between the pole O of the condenser lens 31 and its focal point F, a central relative intensity of light received by the pin photodiode 33 is maintained at a constant value although a peripheral relative light intensity is reduced.

With the above arrangements of the optical radar system according to the present invention, when the laser light projected from the light emitting unit 20 is reflected by an object ahead of the system vehicle, the reflected laser light is captured by the condenser lens 31 and then is directed onto the pin photodiode 33 of the light receiving element 32. The pin photodiode 33 then provides electric current based on the received light intensity which is, as shown in the solid line M3 in FIG. 2(B) maintained constant within the range of from $-\theta_0$ to $+\theta_0$ and decreased linearly out of the range from $-\theta_0$ to $+\theta_0$ even when an incident angle, or angle of field $\theta$ is greater than $\theta_0 = \tan^{-1}(W/2f)$. In other words, the pin photodiode 33 of the present invention is so arranged as to gradually decrease an area of the light intercepting surface 33a exposed to the reflected laser light according to an increase in the angle of field $\theta$ (i.e., the incident angle). The angle of field $\theta$ of the optical radar system may be increased wider than that in the arrangement wherein the pin photodiode 33 is arranged on the focal point F of the condenser lens 31.

Additionally, according to the laser radar equation, it is known that the intensity of light, reflected from a reflective object such as a reflector in a tail lamp of an automotive vehicle which is smaller in area than a radiation beam, varies usually in proportion to the fourth power of a distance to the reflective object. Thus, when a preceding vehicle traveling ahead of the system vehicle is assumed as a detecting target, a maximum detectable distance becomes proportional to the fourth power of intensity of light reflected from the target preceding vehicle.

Figure 3:
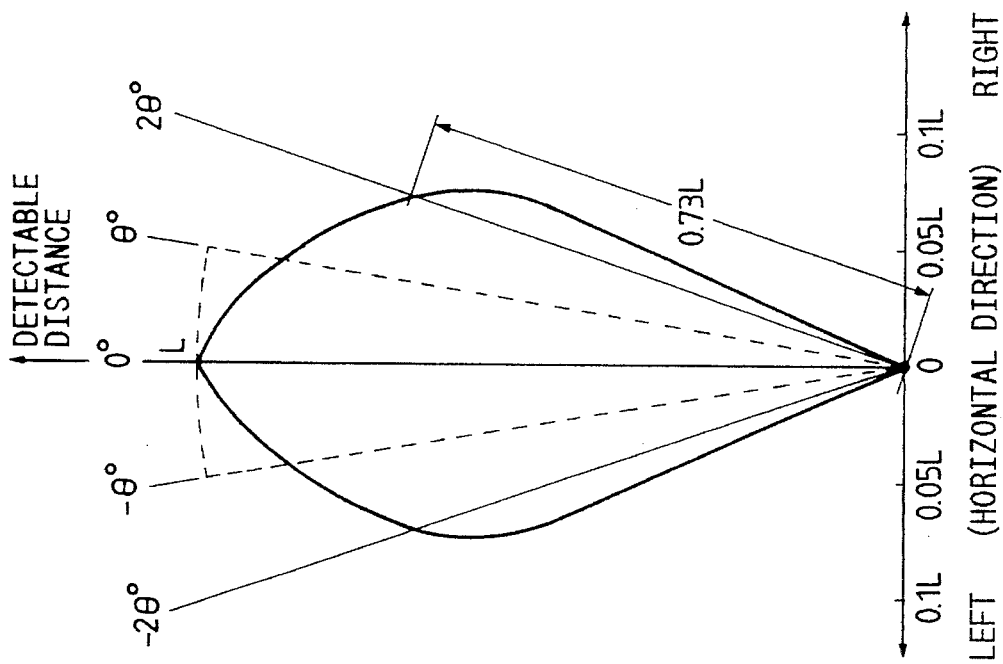
FIG. 3 is a graph which shows a detectable zone assured by an optical radar system of the present invention.
Figure 5:
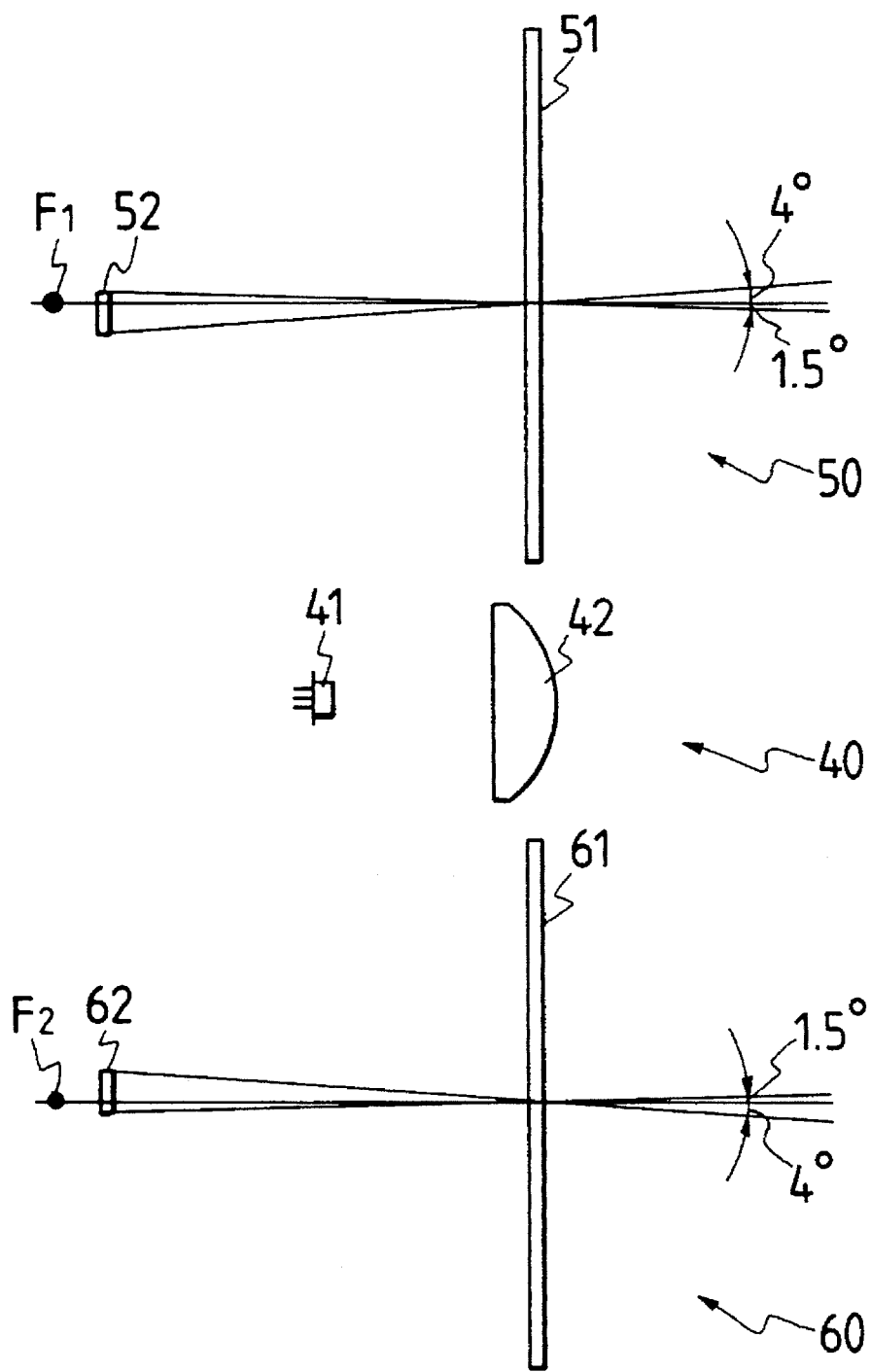
FIG. 5 is an illustration which shows a second embodiment of an optical radar system according to the present invention.

Accordingly, a detectable zone of the light receiving unit 30 which arranges the pin photodiode 33 in the position, as shown by the solid line in FIG. 2(A), to establish the intensity of light received on the light-sensitive surface 33a, as shown in the solid line in FIG. 2(B), lies in an area defined by a solid line in FIG. 3. A broken line shows a detectable zone when the pin photodiode 33 is, as shown by the dashed line in FIG. 2(A), arranged on the focal point F of the condenser lens 31.

For example, when the pin photodiode 33 is placed on the focal point F of the condenser lens 31, it will become impossible to receive laser light rays propagated through the condenser lens 31 from a right angular direction $2\theta_0$ so that the target preceding vehicle cannot be tracked by the laser light. However, in the laser radar system of the present invention, the pin photodiode 33 is, as already mentioned, arranged for gradually decreasing an area of the light-sensitive surface 33a exposed to the laser rays reflected by the target preceding vehicle according to an increase in incident angle $\theta$ so that the laser rays propagated from the condenser lens 31 is partly received by the pin photodiode 33. In this arrangement, according to the relation between the received light intensity and the angle of field, as shown in FIG. 2(B), the intensity of light received from the angular direction $2\theta_0$ becomes about 28% of the intensity of light received from the front (i.e., an angular direction $\theta=0°$), however, a detectable distance in this angular direction becomes about 73% of the detectable distance L in a frontal direction since a detectable distance is, as described above, defined in proportion to the fourth power of intensity of received light according to the laser radar equation. This results in the detectable distance in the angular direction of $2\theta_0$ becoming 0.73L.

For the above reasons, a detectable zone assured by the laser radar system of the present invention becomes smaller in angle of field in a distant area than that, as shown in a broken line in FIG. 3, in the arrangement wherein the pin photodiode 33 is placed on the focal point F, while it becomes greater in a close area. The detectable zone is, thus, widened in the close area.

Figure 4:
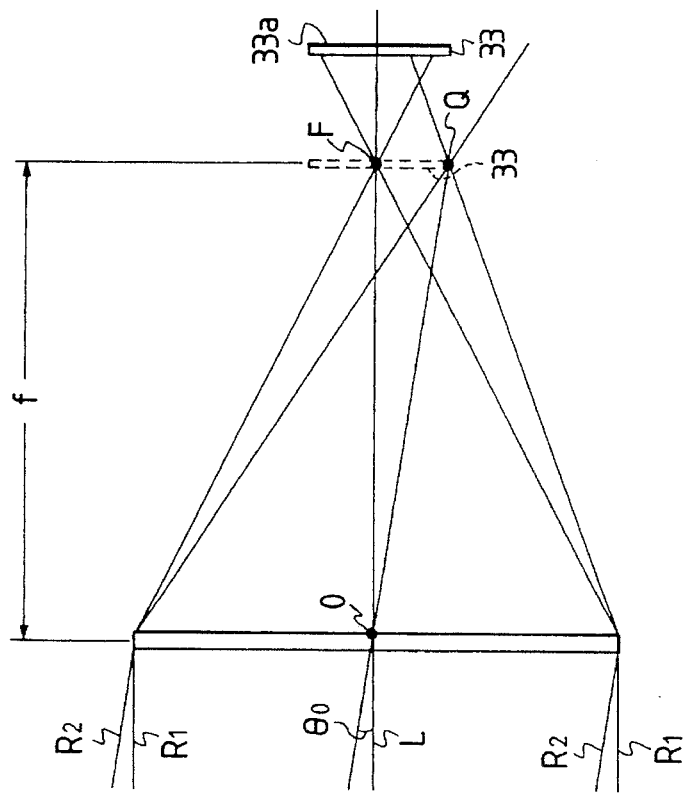
FIG. 4 is an illustration which shows an alternative arrangement of an optical radar system.

The pin photodiode 33 according to the present invention is, 15 as mentioned above, arranged perpendicular to the optical axis L between the pole O of the condenser lens 31 of the light receiving unit 30 and the focal surface across the focal point F. It should be noted however, that the present invention is not limited to the same and that the pin photodiode 33 may be, as shown in FIG. 4, mounted behind the image forming side focal surface of the condenser lens 31 (i.e., at a position opposite the condenser lens 31 with respect to the image forming side focal surface) in lieu thereof.

Referring to FIGS. 5 to 8, there is shown an alternative optical radar system according to the present invention. This optical radar system includes a light emitting unit 40, a first light receiving unit 50, and a second light receiving unit 60 which are disposed in a suitable casing (not shown).

The light emitting unit 40 is of a multi-beam type which includes a three-array laser diode 41 arranged for radiating laser beams horizontally. The light emitting unit 40 further includes a condenser lens 42 which is provided with an aspherical toric plano-convex lens arranged coaxially with the three-array laser diode 41 in front thereof for distributing the laser beams radiated from the three-array laser diode in a suitable laser radiation pattern.

Figure 6:
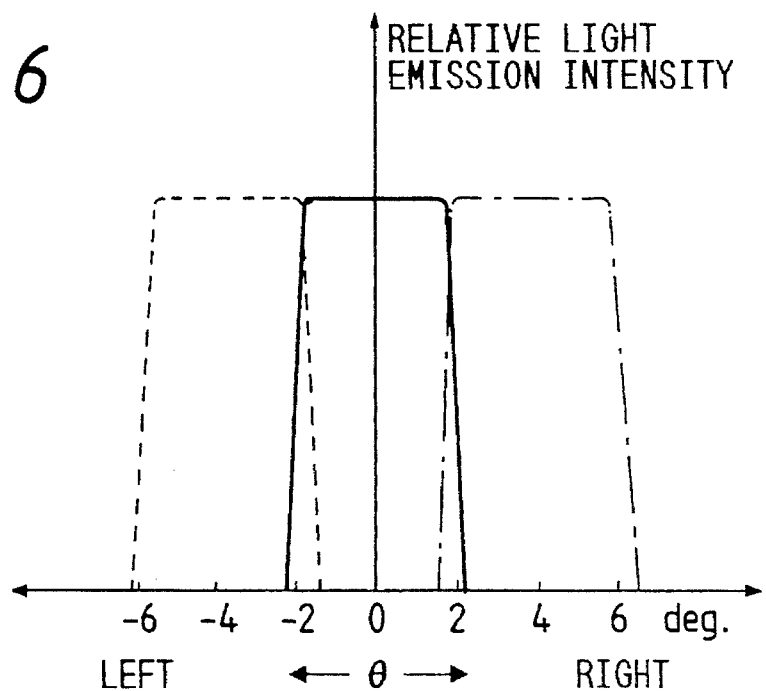
FIG. 6 is a graph which shows the variation in light emission intensity of a light emitting unit of a second embodiment.

FIG. 6 shows an example of the laser radiation pattern of the three-array laser diode 41 wherein a central laser beam is radiated over a range of from $-2°$ to $2°$, a left laser beam is radiated over a range of from $-6°$ to $-2°$, and a right laser beam is radiated over a range of $2°$ to $6°$. With this radiation pattern, an essentially uniform laser light intensity may be obtained in a horizontal direction over the range of from $-6°$ to $6°$.

The first light receiving unit 50 is arranged opposite the second light receiving unit 60 across the light emitting unit 40. The first light receiving unit 50 includes a condenser lens 51 and a photodiode 52 functioning as a light emitting element. The condenser lens 51 is provided with a compact and light weight Fresnel lens having a short focal length. The photodiode 52 has a wide light-sensitive surface for assuring a wide angle of field in a horizontal direction, and is arranged apart from a focal point $F_1$ of the condenser lens 51 toward the condenser lens 51 by a preselected interval and is slightly offset toward the light emitting unit 40 (i.e., downward, as viewed in the drawing) on an optical axis of the condenser lens to be exposed to laser beams propagated from the front and the left direction for establishing a left angle of field of 4° and a right angle of field of 1.5°.

The second light receiving unit 60 is of essentially the same construction as the first light receiving unit 50, and includes a condenser lens 61 and a photodiode 62. The condenser lens 61 is provided with the same Fresnel lens as the first light receiving unit 50. The photodiode 62 also has the same light-sensitive surface as the photodiode 52 which is shifted toward the condenser lens 61 from a focal point $F_2$ thereof by a preselected interval and is slightly offset toward the light emitting unit 40 (i.e., upward, as viewed in the drawing) on an optical axis of the condenser lens 61 to be exposed to laser beams propagated from the front and the right direction for establishing a left angle of field of 1.5° and a right angle of field of 4°.

Figure 7:
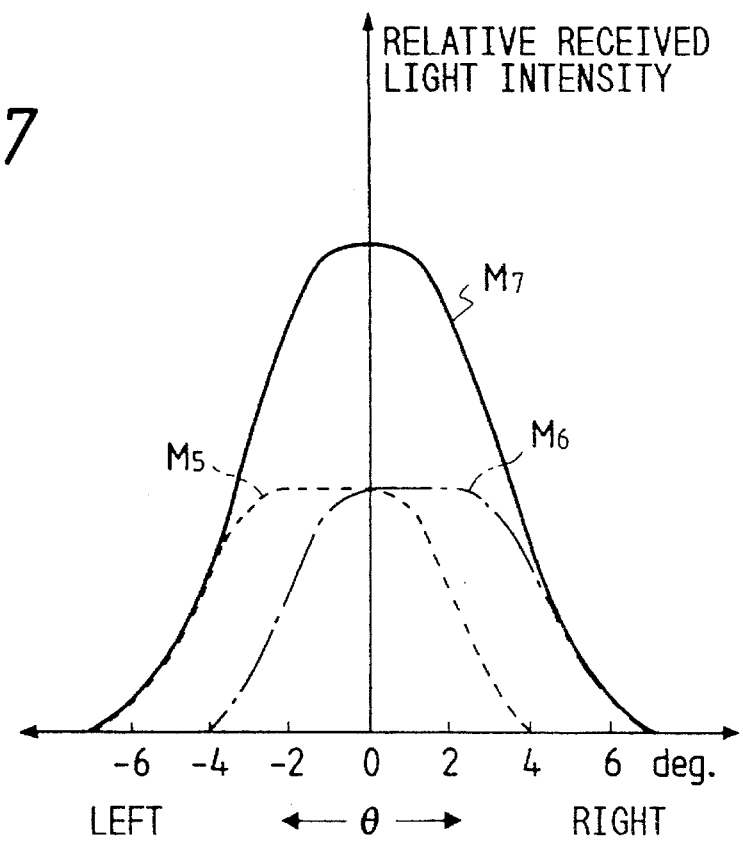
FIG. 7 is a graph which shows the variation in intensity of light received by two photodiodes according to the second embodiment.

With the above arrangements, a relative intensity of laser light received by the light receiving unit 50 is, as shown by a broken line M5 in FIG. 7, decreased as being apart from the central range ($\theta=O$), however, an angle of field will fall in a range of from more than 6° in a left direction to more than 4° in a right direction. Additionally, a relative intensity of laser light received by the light receiving unit 60 is, as shown by a broken line M6 in FIG. 7, decreased as being apart from the central range ($\theta=O$), however, an angle of field will fall in a range of from more than 6° in a right direction to more than 4° in a left direction. Accordingly, it will be appreciated that an angle of field assured by a combination of the light receiving units 50 and 60, as shown by a solid line M7, ranges ±6°.

Figure 8:
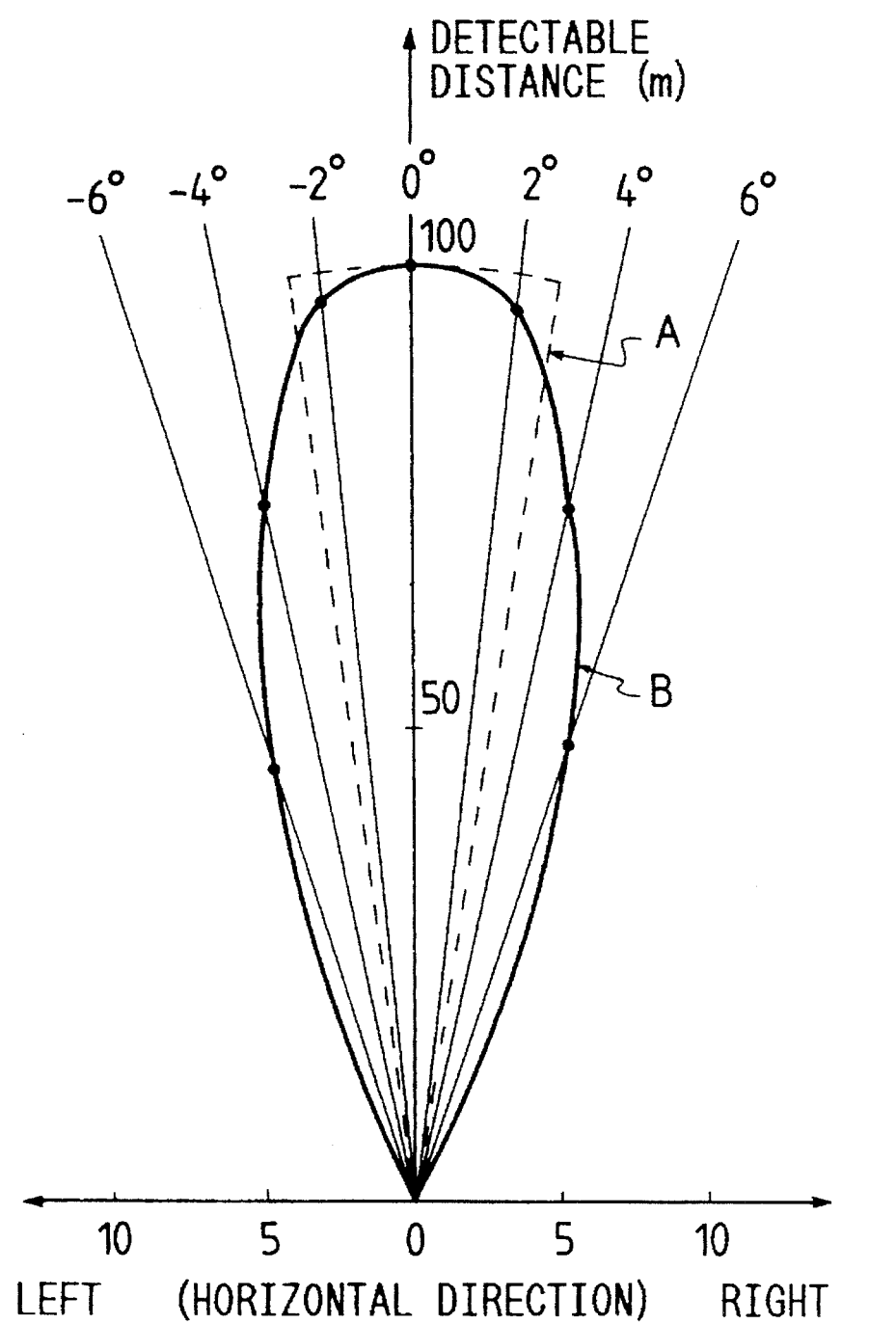
FIG. 8 is a graph which shows a detectable zone assured by an optical radar system of the second embodiment.

FIG. 8 shows a detectable zone which is defined by the received light intensity, as shown by the solid line M7 in FIG. 7, over the field angle range of ±6°. In the drawing, a broken line represents a detection area A detectable with an arrangement wherein the photodiodes 52 and 62 are so arranged as to coincide at their centers with the focal points $F_1$ and $F_2$ of the condenser lenses 51 and 61, an angle of field of the detection area A falls in a range of about ±2.75°.

As can be seen in the drawing, a target object present ahead of the radar system at an angle of 6° in a right direction cannot be tracked in the detection area A since a laser beam reflected by the target object does not enter the detection zone A. However, in the radar system of this embodiment, the photodiode 62 is arranged to be exposed to part of laser rays propagated through the condenser lens 62 of the light receiving unit 60 so that an intensity of received light propagated from a right direction of 6° becomes approximately 6.7% of that in a forward direction ($\theta=O$) according to the relation, between the received light intensity and the angle of field, shown by the solid line M7 in FIG. 7. Additionally, as already stated, according to the radar equation, a detectable distance is proportional to the fourth power of the received light intensity, therefore, a detectable distance in the right direction of 6° becomes 50% of that in the forward direction (e.g., 50m).

It will be appreciated that the detectable zone assured by the radar system of the second embodiment is smaller in angle of field in a distant area than the detection area A in FIG. 8, while, in a closer area, the angle of field is wider.

Generally, an intervehicle distance determining system for automotive vehicles requires a detectable zone wherein a distant target object (i.e., a preceding vehicle) may be tracked in a front range of ±1° or ±2°, while, in right or left ranges, only a relatively closer object may be tracked. It will be noted that the detection area B in FIG. 8 meets the above requirements.

Additionally, when adding outputs of two light receiving elements, it will cause a total output signal component to become twice, resulting in a total noise component being increased. Usually, an output signal noise is caused by a white light component and thus the total noise component becomes the square root of 2 times, resulting in a total S/N ratio becoming square root of 2 times. Thus, in the optical radar system of the second embodiment including two light receiving elements (i.e., the photodiodes 52 and 62), the detection ability becomes square root of 2 times that in an arrangement including a single light receiving element.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims. For example, the photodiodes 52 and 62 are, as mentioned above, arranged for assuring an angle of field wider in a horizontal direction. It will be noted however, that the present invention is not limited to the same and that the photodiodes 52 and 62 may also be designed for establishing an angle of field wider in a vertical direction. In addition, more than three light receiving units may be provided to further widen a detectable area and/or to increase the intensity of received light.

What is claimed is:

1. An optical apparatus comprising:
   a light emitting device for emitting light; and
   a light receiving device for receiving light reflected from the target object, said light receiving device including:
   a first condenser lens arranged at a first position to capture and transmit the reflected light,
   a first light sensitive element, wherein said first light sensitive element and said first condenser lens each lie substantially on a first common axis, wherein said first light sensitive element is arranged at a position axially offset from a focal point of said first condenser lens, wherein said first light sensitive element receives the reflected light transmitted by said first condenser lens, wherein an intensity of the transmitted reflected light transmitted to said first light sensitive element is inversely proportional to an angle of incidence of the transmitted reflected light incident on said first common axis,
   a second condenser lens arranged at a second position different from said first position to capture the reflected light,
   a second light sensitive element, wherein said second light sensitive element and said second condenser lens each lie substantially on a second common axis, wherein said second light sensitive element is arranged at a position axially offset from a focal point of said second condenser lens, wherein said second light sensitive element receives the reflected light transmitted by said second condenser lens, wherein an intensity of the transmitted reflected light transmitted to said second light sensitive element is inversely proportional to an angle of incidence of the transmitted reflected light incident on said second common axis.

2. An apparatus as set forth in claim 1, wherein said first light and second light sensitive elements are arranged at respective positions shifted toward said first and second condenser lenses from focal surfaces of said first and second condenser lens, respectively.

3. An apparatus as set forth in claim 1, wherein said first light sensitive element is arranged such that a center of said first light sensitive element is disposed at a position offset from an optical axis of the first condenser lens and toward said second light sensitive element, said second light sensitive element being arranged such that a center of said second light sensitive element is disposed at a position offset from an optical axis of the second condenser lens and toward said first light sensitive element.

4. An apparatus as set forth in claim 1, wherein said light emitting means comprises a three-array laser diode and a condenser lens provided with an aspherical toric plano-convex lens.

5. An apparatus as set forth in claim 1, wherein said first and second condenser lens are provided with a Fresnel lens.

6. An apparatus as set forth in claim 1, wherein a first position, at which said first condenser lens is located, is opposite a second position, at which said second condenser lens is located, across said light emitting means in a radiation plane of said light emitting means.

7. An optical apparatus for detecting a target object, comprising:
   a light emitting device; and
   a light receiving device, wherein said light receiving device includes:
   a first condenser lens operably arranged to capture and transmit light which is reflected from a target object;

a first light sensitive element operably associated with said first condenser lens, wherein said first light sensitive element receives said reflected light transmitted by said first condenser lens, wherein said first light sensitive element is offset from a focal point of said first condenser lens by a first separation;

a second condenser lens operably arranged to capture light and transmit light which is reflected from a target object;

a second light sensitive element operably associated with said second condenser lens, wherein said second light sensitive element receives said reflected light transmitted by said second condenser lens, wherein said second light sensitive element is offset from a focal point of said second condenser lens by a second separation;

wherein said first separation and said second separation operably define a detection field in which a target object can be detected, wherein said detection field has a first region having a first lateral dimension and a second region which is distal to said first region having a second lateral dimension which is more narrow than said first lateral dimension.

8. An optical apparatus comprising:

a light emitting device; and a light receiving device arranged to receive light reflected from a target object, wherein said light receiving device includes:

a condenser lens operably arranged to capture and transmit the reflected light; and a light sensitive element operably associated with said condenser lens, wherein said light sensitive element is offset from a focal point of said condenser lens and is arranged so as to receive the reflected light transmitted from said condenser lens, wherein an intensity of the reflected light received by said light sensitive device is inversely proportional to an angle of incidence of the reflected light incident on said light sensitive device, wherein a target object is detected according to a phase difference relationship between the light emitted from said light emitting device to the reflected light received by said light sensitive element.

* * * * *